US007174363B1

(12) United States Patent
Goldstein et al.

(10) Patent No.: US 7,174,363 B1
(45) Date of Patent: Feb. 6, 2007

(54) DISTRIBUTED COMPUTING SYSTEM ARCHITECTURE

(75) Inventors: Neal L. Goldstein, Palo Alto, CA (US); Adam J. Richards, Concord, CA (US); David Sherr, Moraga, CA (US); David Levy, San Francisco, CA (US); Chalon G. Mullins, Danville, CA (US)

(73) Assignee: Charles Schwab & Co., Inc.

( * ) Notice: Subject to any disclaimer, the term of this patent is extended or adjusted under 35 U.S.C. 154(b) by 717 days.

(21) Appl. No.: 10/032,222

(22) Filed: Dec. 19, 2001

Related U.S. Application Data

(60) Provisional application No. 60/271,353, filed on Feb. 22, 2001.

(51) Int. Cl.
*G06F 15/16* (2006.01)
*G06F 3/00* (2006.01)

(52) U.S. Cl. ............... 709/203; 709/205; 719/313; 719/318

(58) Field of Classification Search ............... 709/203, 709/205, 253; 719/313, 318
See application file for complete search history.

(56) References Cited

U.S. PATENT DOCUMENTS

| 4,799,156 | A | 1/1989 | Shavit et al. ............... 705/26 |
| 4,980,826 | A | 12/1990 | Wagner ........................ 705/37 |
| 5,101,353 | A | 3/1992 | Lupien et al. ............... 705/37 |
| 5,270,922 | A | 12/1993 | Higgins ....................... 705/37 |
| 5,375,055 | A | 12/1994 | Togher et al. ............... 705/37 |
| 5,864,827 | A | 1/1999 | Wilson ........................ 705/35 |
| 5,870,717 | A | 2/1999 | Wiecha ........................ 705/26 |
| 5,880,446 | A | 3/1999 | Mori et al. ................. 235/380 |
| 5,946,667 | A | 8/1999 | Tull et al. .................... 705/37 |
| 6,021,470 | A | 1/2000 | Frank et al. ................ 711/138 |
| 6,269,343 | B1 | 7/2001 | Pallakoff .................... 705/26 |
| 6,324,587 | B1 | 11/2001 | Trenbeath et al. .......... 719/310 |
| 6,446,048 | B1 | 9/2002 | Wells et al. ................ 705/35 |
| 6,457,021 | B1 | 9/2002 | Berkowitz et al. ......... 707/201 |
| 6,505,175 | B1 | 1/2003 | Silverman et al. .......... 705/37 |
| 6,618,764 | B1 * | 9/2003 | Shteyn ........................ 709/249 |
| 6,643,661 | B2 * | 11/2003 | Polizzi et al. .............. 707/100 |
| 2002/0173984 | A1* | 11/2002 | Robertson et al. ............. 705/1 |
| 2003/0152182 | A1* | 8/2003 | Pai et al. .................... 375/372 |

OTHER PUBLICATIONS

Pending U.S. Appl. No. 09/672,684 entitled "Method And System For Processing Transaction" by Neil L. Goldstein et al., filed Sep. 28, 2000.

* cited by examiner

*Primary Examiner*—Jason Cardone
*Assistant Examiner*—Tanim Hossain
(74) *Attorney, Agent, or Firm*—Farella Braun + Martel; Brian Keating

(57) ABSTRACT

A computing system architecture is based upon a peer-to-peer, asynchronous model. The architecture specifies a set of infrastructure facilities that comprise an inter-prise operating system. The inter-prise operating system provides all the facilities that make application coding as easy in the peer-to-peer asynchronous model as it is in a hierarchical, synchronous model. Services, which reside in containers, are linked asynchronously by an inter-prise bus and use data from a virtual data store.

40 Claims, 11 Drawing Sheets

DISTRIBUTED COMPUTING SYSTEM ARCHITECTURE

CROSS-REFERENCE TO RELATED APPLICATION

The present application claims the benefit of U.S. Provisional Application Ser. No. 60/271,353, filed Feb. 22, 2001, titled COMPUTING SYSTEM ARCHITECTURE.

FIELD OF THE INVENTION

The present invention relates generally to the field of distributed computing system architectures. More particularly, the present invention provides a computing system architecture in which asynchronous services, which reside in containers, are linked by an inter-enterprise system bus, and use data from a virtual data store. The computing system architecture of the present invention finds particular application in the field of electronic commerce.

DESCRIPTION OF THE PRIOR ART

Currently, a substantial amount of business is conducted using electronic commerce. There have been several phases in the development of electronic commerce. In each of these phases, more flexibility has been added to the way systems are constructed. Additionally, with each phase, the way systems perform has changed radically for both businesses and customers.

Prior to the development of the Internet, the typical structure of systems was to build a set of initially monolithic back-end servers, and then add new services in front of these to communicate with clients. A three-tier model of computing evolved, with an intermediate application server that addressed the problems of manageability and scalability as the number of clients grew. In practice, these systems were never as simple as the architectural diagrams made them out to be. They generated islands of computing, each with incompatible services and clusters of inaccessible data. This led to a spider's web of interconnected activity and ensured that little problems at one end of the network became large problems throughout the network. A new class of software was developed to integrate heterogeneous services.

True electronic commerce began with Web sites, brochures, and manual order entry. Initially, the Web was treated as just another client. There was a class of simple application Web servers that created its own data and used its own protocols. The simplest applications to write were read-only brochure and e-mail order entry systems, which allowed more efficient distribution of information. They did not, however, have a significant impact on the customer experience and did not change consumer behavior. Competition among early adopters centered around who had the most seductive graphics and interactive content. These systems typically were flashy front-ends attached to unchanged back-end systems. Much of the real work was still done by people.

On the application development front, first generation applications tended to be monolithic. In particular, the details of writing well-behaved applications were not separated from business logic. Well-behaved applications have to address a number of system integration issues, including security, user interaction (presentation), persistence (data access), systems management, and interprocess communication. In a first generation program, all these elements were contained within a few lines of code. This duplication of code had a severe impact on maintenance because finding and fixing redundant modules was costly. The impact on extensibility was also serious because it was difficult to change distributed system integration functions. Finally, the impact of reliability was substantial because a change in one system integration function had the potential to impact all other functions.

For many industries, the first generation model created little customer value. This was true for the stock brokerage industry. The first generation companies did not deliver real-time products electronically. The brokerage industry operates in a real-time world where prices change continuously and transaction completion requires integration with market data providers, trading venues, and settlement agencies. This mandates the integration of multiple inputs, processes and outputs.

In the second generation of electronic commerce, the entire customer interaction, from entering an order to delivering the end result, is done online. The customer becomes acutely aware of the underlying frailties of the assorted systems that perform the subprocesses of the order. The design of these systems reflects to customers the status of the respective processes.

Second generation development practices began to emphasize the separation between system integration concerns and business logic. At first, this separation took the form of modularization, which separated the procedures that encapsulate business logic from those that perform system integration. A further step was then taken to isolate the system integration routines into modules that could be called. This reduced greatly the amount of duplication, although there was still much duplicate code in the calls to APIs. The second generation also facilitated extensibility because changes in system integration functions were localized within a module. Finally, because clients could depend only on APIs, reliability improved. However, developers were responsible for invoking API functionality in a timely and correct manner.

Prior to the Internet, old-line financial institutions monopolized access to information. They turned the resulting customer ignorance about products and performance into profits. Access to information has allowed customers to disintermediate commissioned brokers as information distributors and take control of their financial lives. The Internet has empowered customers with more information and choices. The Internet economy has shifted the balance of power to customers.

Current electronic commerce systems have two salient characteristics. First, they are divided primarily along business and application ownership lines. The system and application boundaries are determined exclusively by the organization that owns the application or service. The second characteristic is that they are built with data control residing in physical control. Data belongs to a particular business and that business determines its location, which forces accessing applications to choose between deployment on that same platform or inferior performance. The combination of these two factors has led to a tightly coupled, monolithic, centralized model with a classic two- or three-tiered client/server architecture.

Most current applications are synchronous, hierarchical variants of the client/server model. Once the choice of client or server is made, deployment changes typically result in application changes or rewrites. Because services are coupled to clients, change management is difficult. A few asynchronous applications exist today. Such applications are written directly to the messaging product APIs. Current asynchronous applications are very dependent on the way applications run on a given platform. They are also error-prone, often unmanageable, and generally inflexible.

There is a need for a system that allows platform independent, asynchronous applications to be built in a way that can support a business that is changing at Internet speed. Normally, change implies instability and unavailability. Moreover, the current models are inflexible.

In the emerging electronic commerce environment, neither instability, unavailability, nor inflexibility can be tolerated. Services must be placed onto any platform that makes sense. Services must be able to use, or be used by, services on other platforms without knowing, at design time, what platform choice may be made in the future at run time. Applications will need to portable, by providing an infrastructure that hides platform and transport details. Other components must allow data to be distributed. The system must allow qualities of service, such as security and monitoring, to be added without requiring application code.

SUMMARY OF THE INVENTION

The computing system architecture of the present invention is based upon a peer-to-peer, asynchronous model. The architecture of the present invention specifies a set of infrastructure facilities that comprise an inter-enterprise operating system, which is referred to herein as the inter-prise operating system. The aim of the inter-prise operating system is to provide all the facilities that make application coding as easy in the new peer-to-peer asynchronous model as it is in the current hierarchical, synchronous model. Each inter-prise operating system component defines an architectural area, and advances strategic goals in that area. According to the present invention, services, which reside in containers, are linked asynchronously by an inter-prise bus and use data from a virtual data store.

Services are applications that are formally registered with a service repository. Each service may play two roles, i.e., service provider or service requester. In the peer-to-peer environment of the present invention, a service may be both a requester and a provider.

A container is a component that hides the details of asynchronous messaging and platform dependencies from the business application code of the service. According to the present invention, there are two types of containers, i.e., service requester containers and service provider containers. A service requester container hides details of making a request to the inter-prise bus either to request a service or publish an event. From the perspective of the application residing within the service requester container, the request is a simple call. A service provider container hides details of servicing the request. From the perspective of the application residing in the service provider container, the application sees itself as being invoked locally. The two-container model of the present invention makes programming asynchronous service applications as easy as programming synchronous ones.

The inter-prise bus provides a common way to connect services. The bus hides details of the actual transport mechanisms from applications, making them transportable. A service provider needs to connect to the inter-prise bus in order to publish its services for use by requests from other services. A service requester needs to connect to the bus to utilize the services provided.

The inter-prise bus also provides a way for extra information, in the form of context, to be added to messages that flow between service applications. Context is data that is usually not known to the application, but which flows within a request that it makes or event that it publishes. Examples of context include security context and system management context.

Most business services call or contain underlying data. In a centralized environment, all the data can be locally stored, updated, and referenced. However, in a distributed environment, an inquiry service may be remote from an updating service, and so forth. A virtual data store according to the present invention hides the details of data distribution, or request shipping, from the applications. The virtual data store manages the data, and provides a view of the latency of the data to those applications that need it.

DESCRIPTION OF THE PREFERRED EMBODIMENT

Figure 1:
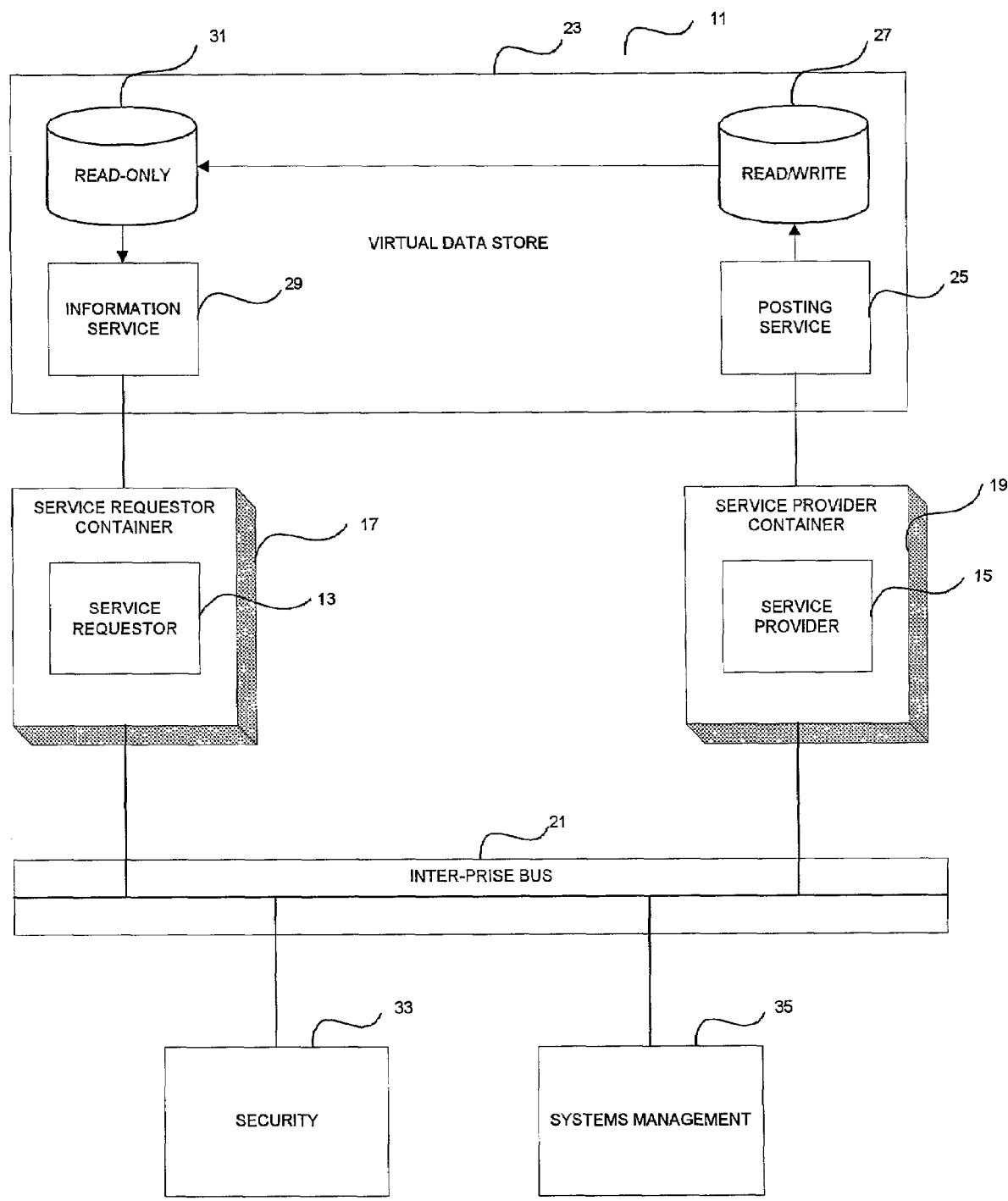
FIG. 1 is a block diagram of a preferred embodiment of the inter-prise operating system of the present invention.

Referring now to the drawings, and first to FIG. 1, a block diagram of an inter-prise operating system according to the present invention is designated generally by the numeral 11. According to the present invention, asynchronous services, such as a service requester 13 and a service provider 15, reside in containers 17 and 19, respectively. As will be explained in detail hereinafter, containers 17 and 19 simplify the programming of applications by providing a way of naturally invoking services according to a processing model and provide an environment in which services may run according to a services model.

Services 13 and 15 are linked by an inter-prise bus 21, which handles messaging between requestors 13 and providers 15. According to the present invention, a particular application can be either a service requester or a service provider.

Services use data from a virtual data store 23. As will be explained in detail hereinafter, virtual data store 23 includes a posting service 25 that receives data from service provider 15. Posting service 25 has access to read/write storage 27.

Virtual data store 23 also includes an information service 29 that provides information to service requester 13. Information service 29 has access to read only storage 31. Data is selectively replicated, according to the present invention, from read/write storage 27 to read-only storage 31. As will be explained in detail hereinafter, inter-prise operating system 11 also includes a security component 33 and a systems management component 35 linked to inter-prise bus 21.

Figure 2:
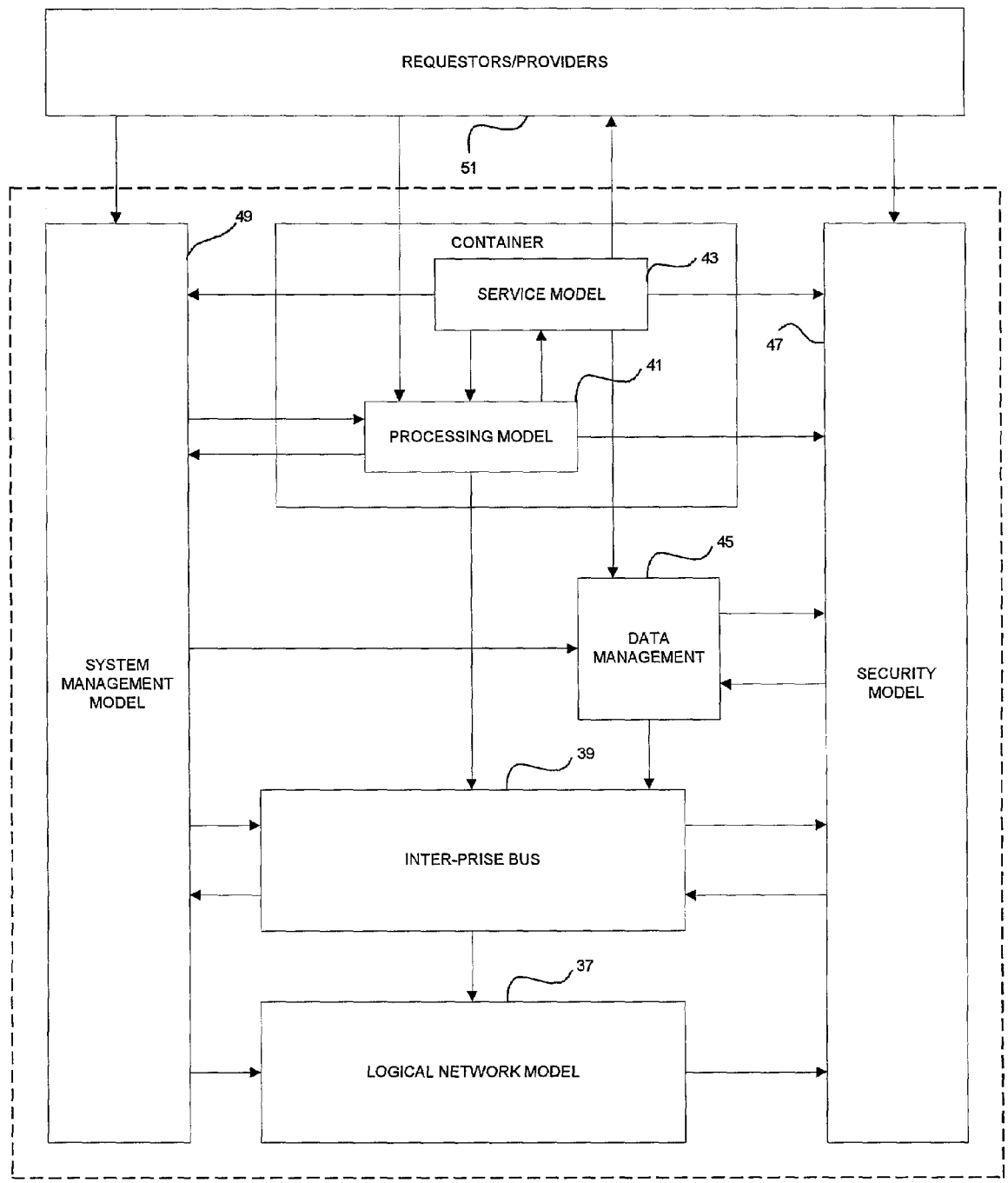
FIG. 2 is a block diagram of the core stack components of the present invention.

Referring now to FIG. 2, there is illustrated a block diagram of the core set of components of the inter-prise operating system of the present invention. The core set of components provides a distributed operating system that allows application programmers to concentrate on business logic and not worry about questions of distribution or robustness at implementation time.

The core components of the inter-prise operating system of the present invention include a logical network model 37. The logical network model provides the physical connections that ties systems together. According to the present invention, logical network model 37 is a new style of network that is application-aware. An inter-prise bus model 39 sits on top of logical network model 37. Inter-prise bus 39 provides asynchronous communication and it packages messages with context. Inter-prise bus 39 hides the technology used to connect together the communicating partners.

A processing model 41 provides a requestor container that allows users to use inter-prise bus 39 to communicate without knowing details of the service. According to the present invention, a requester sees a simple service without the complexities of system integration issues. A service model 43 provides a service container that allows the service to respond to messages without knowing the details of the requester. This means that the service can be written as a synchronous program without the difficulties inherent in asynchronous programming.

A data management model 45 provides a virtual data store that gets data to where applications need it. Data management model 45 maintains knowledge of data currency for use by applications. A security model 47 provides security services for all parts of the inter- prise operating system. Similarly, a system management model 49 provides facilities to manage both the inter- prise operating system and the applications that use it.

Requestors and providers, indicated at block, 51 are parties external to inter-prise operating system 11. Requestors and providers typically have connections to other environments. In some cases, requesters and providers may desire to operate in a synchronous manner or use tools that the inter-prise operating system of the present invention does not support. It is the responsibility of boundary nodes to convert the external requests and responses to and from the inter-prise operating system.

Figure 3:
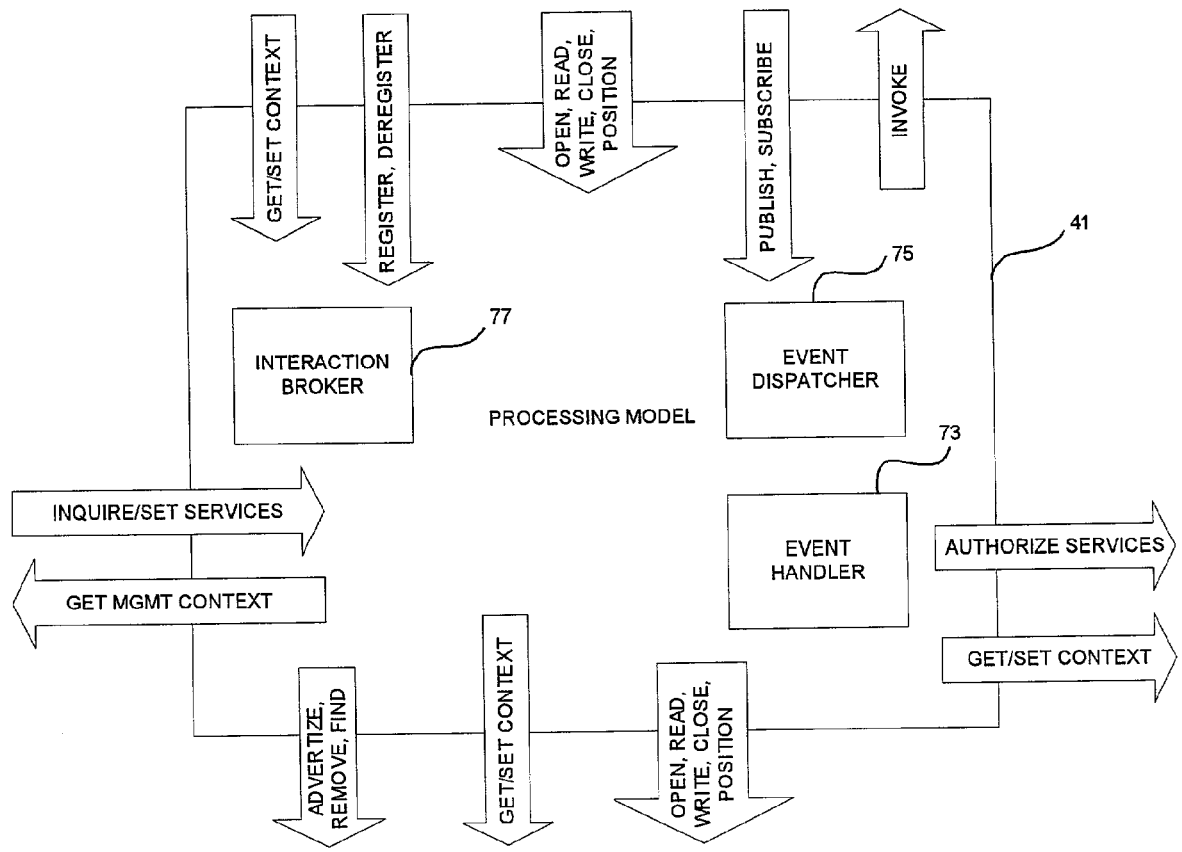
FIG. 3 is a block diagram of the processing model component of the present invention.

Referring now to FIG. 3, a block diagram shows the internal sub-components and external interfaces of processing model 41. Processing model 41 defines how services use the inter-prise bus facilities to communicate. The processing model 41 defines a set of semantics, regardless of the details of the messages themselves.

The processing model simplifies the task of writing applications that need to interact directly with the inter-prise bus. In general, distributed programming is difficult. When one changes a program from local to distributed programming, a set of new errors can occur, such as the server being down and the client being up, or a request having timed out. Distributed programming problems are helped slightly by using a subsystem such as an Object Request Broker (ORB) or a Customer Information Control System (CICS).

Asynchronous programming is even more difficult. In an asynchronous program, there are extra states besides success or failure, such as not processed yet. The client has to make a second call to get results, and the service has to have a component that listens for input. Nothing is certain because the system has introduced time dependencies. Programming distributed, asynchronous systems is harder still. According to the present invention, the processing model of the present invention makes asynchronous, distributed applications as easy to code as synchronous, local applications.

The processing model of the present invention supports a move to a more flexible business model by allowing code to be written in an event style and then be subsequently exploited in a request style with no change. The processing model of the present invention allows separation of what is run from the business service that is to be performed, which is a crucial transparency. Finally, the processing model of the present invention supports the notion of a bipartisan contract and compensating actions if that contract is breached, thereby removing the definition of process flow to a higher level from the worker performing anatomic transaction.

Interactions between services according to the present invention are normally asynchronous, but they are always mediated by data flows. The data flows fall into two high-level categories. The first category of data flows is messages, which are discrete units of information. According to the present invention, there are two types of messages. The first message type is a service request message, which is an application of the command design pattern. A service request is a request from a message sender to a message receiver to perform a service, which may or may not require a reply. The other type of message is an event, which may take the form of an event notification or a publish and subscribe notification.

The other category of data flows is streams, which are collections of data passed and processed as a sequence. There are two types of streams. The first type includes mapped streams, in which the stream is mapped onto some underlying structure, such as a file. The other type of streams includes unmapped streams, such as Unix pipes, in which the stream connects two services directly.

Returning to the concept of messages, messages consist of information, called a payload, plus header information for proper transport and routing of the message. A service request has imperative form, and it consists of a command, plus associated parameters. An event notification has declarative form, and it consists of an event name plus associated parameters.

Streams comprise a sequence of data flows, with no header information. A stream differs from a message in that a message typically encapsulates a single piece of information. A stream encapsulates many such pieces, which need not necessarily be homogenous.

The decision about which style of data flow to use is influenced by whether the sender has a stake in what happens once the receiver receives the information. In the case of a service request, the requester knows what the service does, and specifically desires a certain outcome. For example, a piece of order entry logic may need to know that an order placement service exists that can satisfy its requirement before it replies to a caller that the order has been accepted. In that case, the order entry logic creates a placed customer order request message and finds a service, via service discovery, that satisfies the correct requirements. An event notification is used when the message sender does not know or care to specify what the eventual outcome may be.

An event notification notifies any receivers that are interested that an event has occurred, but what action to take is left up to those receivers.

Streams are used for processing data in bulk. Batch processing should be done using streams, because they enable the transition from batch processing to near real-time processing. This transition is possible because one application streams to a file that is read as a stream by another application. This indirect connection can later be converted to a more direct relationship in which the writing application streams directly to the reading application without change. The choice of using the stream for near real-time computing is one of performance. Rather than generating a set of independent messages, the stream allows a bulk transfer of data, which can significantly reduce overhead.

Asynchronous communication according to the present invention provides many benefits to component interactions. Asynchronous connections can inoculate against sympathy sickness. If the caller can complete making the request even if the service is down, the caller's availability is not coupled to that of the service. Asynchronous communication is a powerful technique for providing scalability. Supporting various styles of interaction through a common messaging mechanism provides flexibility in the way services are tied together. The choice of data flow means that the architecture can exploit industry standard technology that has a proven track record, and supplies crucial functions such as support for various levels for quality of service.

Events can be characterized into three types: system, application, and business. System events identify actions within the underlying infrastructure. Examples include successful establishment of a network connection, reclamation of memory, message acknowledgements, space problems on direct access storage devices (DASD), network connection problems, memory problems, and the like. System events are typically cast in the vocabulary of operations personnel or systems programmer. Usually, systems events are non-persistent, and they do not pose problems with security. For example, the inter-prise bus uses events to enable advertisements of services.

Application events signify significant action regarding an application component, such as a program or a job. These can be timing events, required to schedule a job, database commits, completion events, successful handoffs to another component, or aborted processing events. Application events are typically cast in the vocabulary of the application developer. Because application events are so limited in scope, they can often by optimized into local calls at design time.

Business events signify occurrences, in the context of running a financial services firm, such as orders being placed or filled, or companies making announcements. There are also business events that have to do with running a business, such as hiring new people, announcing bonuses or option grants, or managing supplies. Business events are typically cast in the vocabulary of the business customer, and the personnel who interact directly with them.

Streams are set up in two ways. In one way of setting up a stream, another process, usually a job or batch file, spells out the services and the streams that connect them. In a more dynamic mechanism, the stream is built when a request is made to open it, either for reading or writing. Streams can be used for an interaction in which the writer knows the reader. For example, a dividend reinvestment process creates a stream of update requests for a bulk balances updater service. Opening a stream for writing at the beginning generates an event, i.e., bulk balances update stream started. Closing the stream at the end generates another event, i.e., bulk balances update stream ended. These events create and then destroy a stream that connects the dividend investment process, which is the writer, to the bulk balances updater, which is the reader. The writing application checks for the potential availability of the service before writing the stream. The writing application may fall back to creating an individual event if no stream reader exists. Streams can also be used when the reader is completely unknown. For example, when a quote service generates a stream of quotes.

The processing model of the present invention introduces the container concept. A container encapsulates vital systems integration functions, such as data access, transaction management, service invocation, security, and systems management, in a manner that provides a clean, clear separation of concerns for a business service. Systems integration functions are used by specifying the service required through deployment descriptors or property sheets rather than through application code. The business service is implemented with no systems integration code. The container does the appropriate systems integration behavior as specified in the descriptor before invoking the service. From the perspective of the service requester, the container is transparent. That is, the service requester does not see whether the container is there or not.

The container acts as an intermediary between business services and the inter-prise bus. The container applies primary services such as service interaction, transactions, security, and systems management on behalf of the instances of the service at run time.

In discussing containers, it is useful to distinguish how containers operate for service providers and how they operate for service requesters. While any container has at least the potential to operate on behalf of both a service provider and a service requester, the roles are different enough to make the distinction useful.

Containers decouple service providers from the style in which other services wish to interact with them. The business service exports it services as a set of operations that can be called. The container then maps service requests, events, or streams to these operations.

Service provider containers enable participation in extended units of work, primarily through compensating actions. Support for extended units of work simplifies the task of creating services that can participate in transactional workflow. The essential task is to define a compensating action for every action that can be performed by the service. The compensating action should undo the effect of the action; more specifically, it should return the state of the system to what it would have been had the action never occurred.

Service provider containers can encapsulate security and system management policies on behalf of services. If the service is registered in an access control list, for example, then the container can take care of authorization prior to service invocation. The mechanism for exploiting policies is similar to property sheets or deployment descriptors. The property sheets abstract out a set of attributes, and by assigning a value to the attribute, the service defines the policy by which it is to be governed. The container is then responsible for handling the details of how the underlying security and management systems implement those policies.

The service requestor container isolates the complexities of interaction styles. the container can isolate a requestor from the location of a provider, and even optimize for the case where the provider is local. The container can also hide details of the wire formats used by the underlying transports.

The service requester container propagates context as necessary, thereby relieving the service of that burden. A business service need not be aware that context has been passed with it or that the same context will be passed on with any message it sends.

Figure 4:
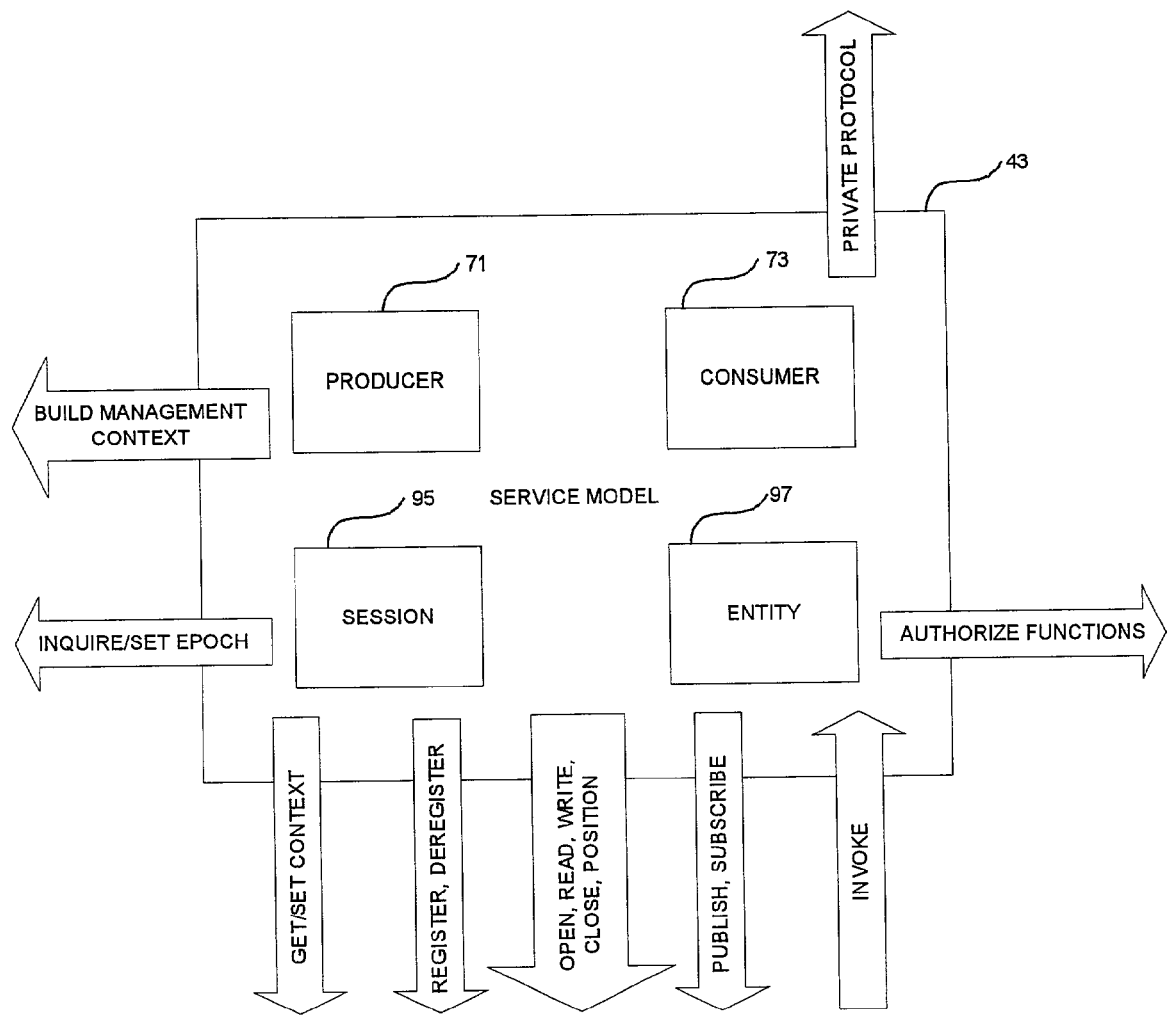
FIG. 4 is a block diagram of the service model component of the present invention.

Referring now to FIG. 4, there is shown a block diagram of the service model 43 showing its external interfaces and internal subcomponents. The service model defines the concept of a service, explains the kinds of services to be found according to the present invention, and specifies how services are developed for deployment on the inter-prise bus. While the processing model is the large-grained, run-time view of the architecture of the present invention, the service model is finer-grained and reveals some aspects of the implementation of the services deployed on the bus. The service model is design, write, and build-time oriented.

The architecture of the present invention is service-oriented. A service-oriented architecture is related to, but distinguishable from, object-oriented and component-based architectures. The Object Management Group's (OMG) Object Management Architecture (OMA) is an example of an object-oriented architecture. Common Object Request Broker Architecture (CORBA) is a key component of OMA. Examples of component-based architectures include Java 2 Enterprise Edition (J2EE) and Microsoft's Distributed Common Object Model (DCOM). The commonality between object-, and component-oriented architectures, and the service-oriented architecture of the present invention is a focus on a unit of modularization. The service-oriented architecture differs from an object-oriented architecture in several ways. The service-oriented architecture does not support inheritance. The service-oriented architecture is flexible in ways of communicating between services, whereas an object-oriented architecture defines interactions in terms of basic object operation and invocation style of object-oriented programming languages. The service-oriented architecture promotes stateless services, while objects are typically viewed as stateful.

The service-oriented architecture of the present invention also differs from a component-based architecture in several ways. The service-oriented architecture is platform independent, while component- based architectures are specific to a language or middleware/operating system environment. The service- oriented architecture is flexible in the ways in which components communicate, while a component-based architecture specifies the ways in which components communicate.

The key concepts in the service model are service, producer 71, and consumer 73. According to the present invention, a service specifies functionality, a producer implements the specified functionality, and a consumer contracts with the producer that provides the service. Producer and consumer are roles that a single service can play. In some contexts, a service may act as a consumer, relying on the functionality provided by other services, and in other contexts it will act as a producer, supplying functionality.

According to the present invention, a service is defined by its output, or by the state changes it produces, or by the information it provides. A service can be viewed as a contract that guarantees results to service requesters. The roles of producer and consumer are independent of interaction styles. Producer signifies that a service produces a result that can be used by other services. The product may be in the form of an answer or a change to system state. This distinction corresponds to the distinction between functions and procedures in programming languages. Functions return results to their callers. Procedures return control, but no result. Consumers rely on these products.

Another way to look at services according to the present invention is through the interfaces they specify. Object-oriented and component-based architectures are focused on one kind of application programming interface, i.e., the set of operations exported by a service for use by other services. However, the object-oriented and component-based views do not account for the relationship between two services when one service publishes events that are consumed by the other service. In addition, neither object-oriented nor component-based architectures account for the relationship between two services when one publishes events that are consumed by the other or when one writes to a stream that is read by the other.

According to the present invention, a service can have one or more of three types of application programming interface. First, a service can have an operation interface, which defines a set of operations that can be called by other services. Second, a service can have an event interface, which defines a set of events that the service raises or handles. Finally, a service can have a stream interface, which defines a set of streams that the service reads or writes. These interfaces are crucial to register a service with the service discovery component of the inter-prise bus. Service definitions populate the service discovery repository.

Supporting three styles of interface gives the architecture of the present invention enormous flexibility. The three interfaces are frequently alternatives. A service can be provided in one context through an operation interface and in another context through an event interface. When the underlying functionality of the service is the same, it is undesirable to provide different versions of a service just to support these interfaces. Accordingly, the architecture of the present invention separates the business function from how it is invoked. In a service based on an operation interface, a producer exports a number of operations and the consumer calls these operations directly, passing data as needed. The called operation may call other operations as needed. Similarly, in an event-driven service the producer goes into an event loop and the consumer sends the event, again passing data as needed.

Referring to FIG. 3 of the processing model, an event handler 73 caches events and an event dispatcher 75 decides what operation to call based on the event. Finally, in a stream or bulk processing-based service the consumer prepares bulk data and the producer accepts the data, goes into a read loop, and calls operations as needed. From the perspective of the service, each of these deployment styles amounts to the same thing. An operation is called and data is made available to it in the appropriate fashion. According to the present invention, the invocation mechanism is externalized and made part of the architecture.

Figure 11:
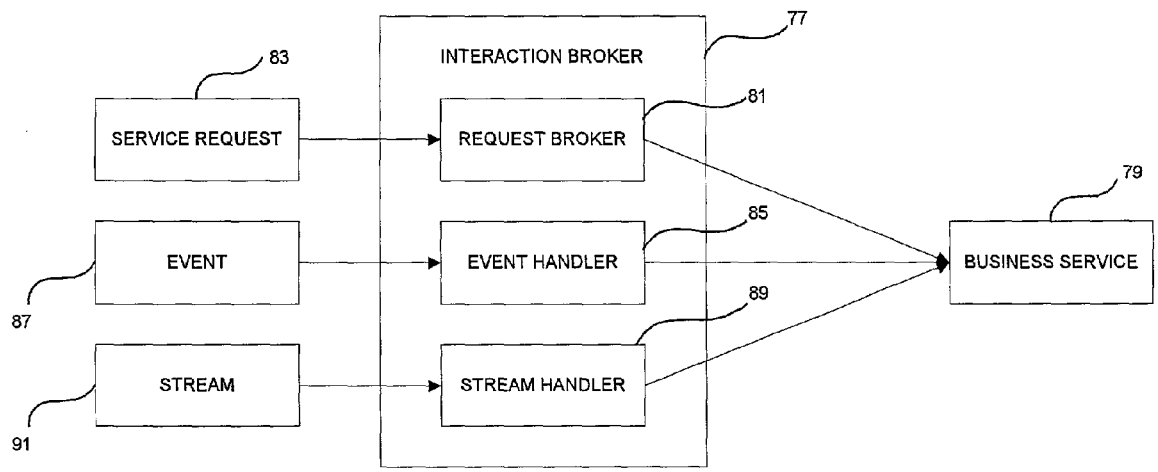
FIG. 11 is a block diagram illustrating the separation of invocation from function by the interaction broker component of the according to the present invention.

Referring now to FIG. 11, the mapping of the service invocation style to the service is handled by the interaction broker component 77 of the processing model. Interaction broker 77 exposes a business service 79 that has an operation interface internally as capable of handling service requests, events, or streams. Interaction broker 77 provides a container-like mechanism that encapsulates the generic capability to handle a particular interface style. Interaction broker 77 includes a request broker 81 that invokes an operation by business service 79 based upon a service request 83. Interaction broker 77 includes an event handler 85, which performs an event-operation mapping to invoke business service 79 based upon an event 87. Finally, interaction broker 77 includes a stream handler 89, which performs a data-type operation mapping to invoke business service 79 based upon a stream 91.

Figure 12:
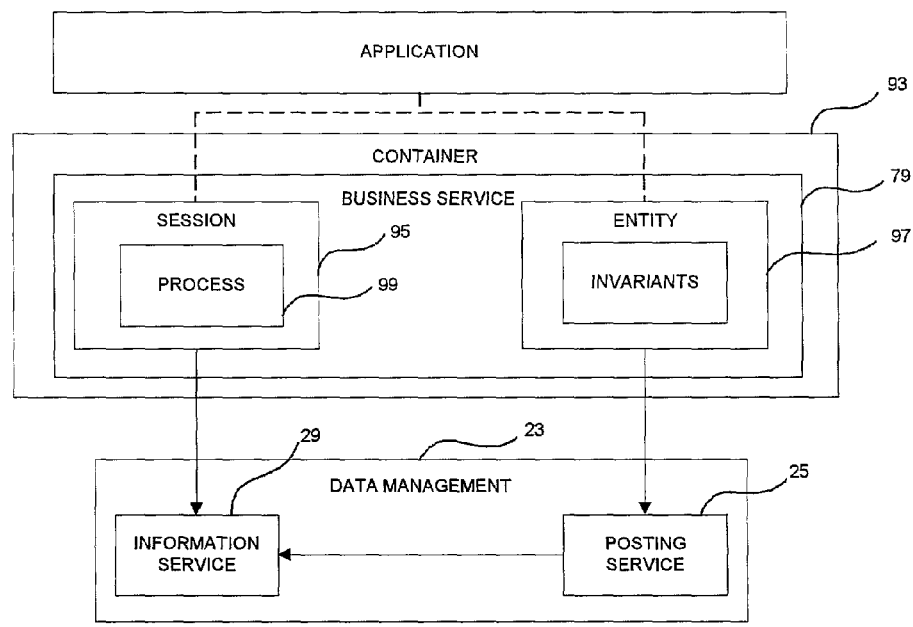
FIG. 12 is a block diagram illustrating the structure of a service according to the present invention.

Referring now to FIG. 12, there is illustrated a block diagram of the structure of a service. A business service 79 resides in a container 93 that insulates the business service from details of how it was invoked and manages its run time efficiently. Business service 79 is made up of a session object 95 and an entity object 97. Business service 79 interacts with data management 23 via information service 29 for inquiry and posting service 25 for updates.

Stateless sessions 95 are the most common form of service object according to the present invention. Most services are based on a session because it does not imply a binding between the application and a particular container, thereby providing good availability and scalability characteristics. The session is used as a way of expressing a process 99 or business rule, which may include accessing entity objects which use data management for a persistent state store.

While entity object 97 is provided, sessions do not always instantiate entities. In general, entities are larger-grained, and may contain references to other objects within them. Even when a session uses state information associated with an entity, it may not be desirable to instantiate the entity, usually for performance reasons. Instead of instantiating an entity, a service may simply access its state in another representation, e.g., strings. Alternatively, the session may instantiate the entity, but without fully populating its state. For example, some relationships may be left uninstantiated. The crucial consideration is whether the business function relies on the business rules/logic defined in the entity. If the rules or logic are required, then the entity should be instantiated. If not, then performance optimizations are encouraged.

Figure 5:
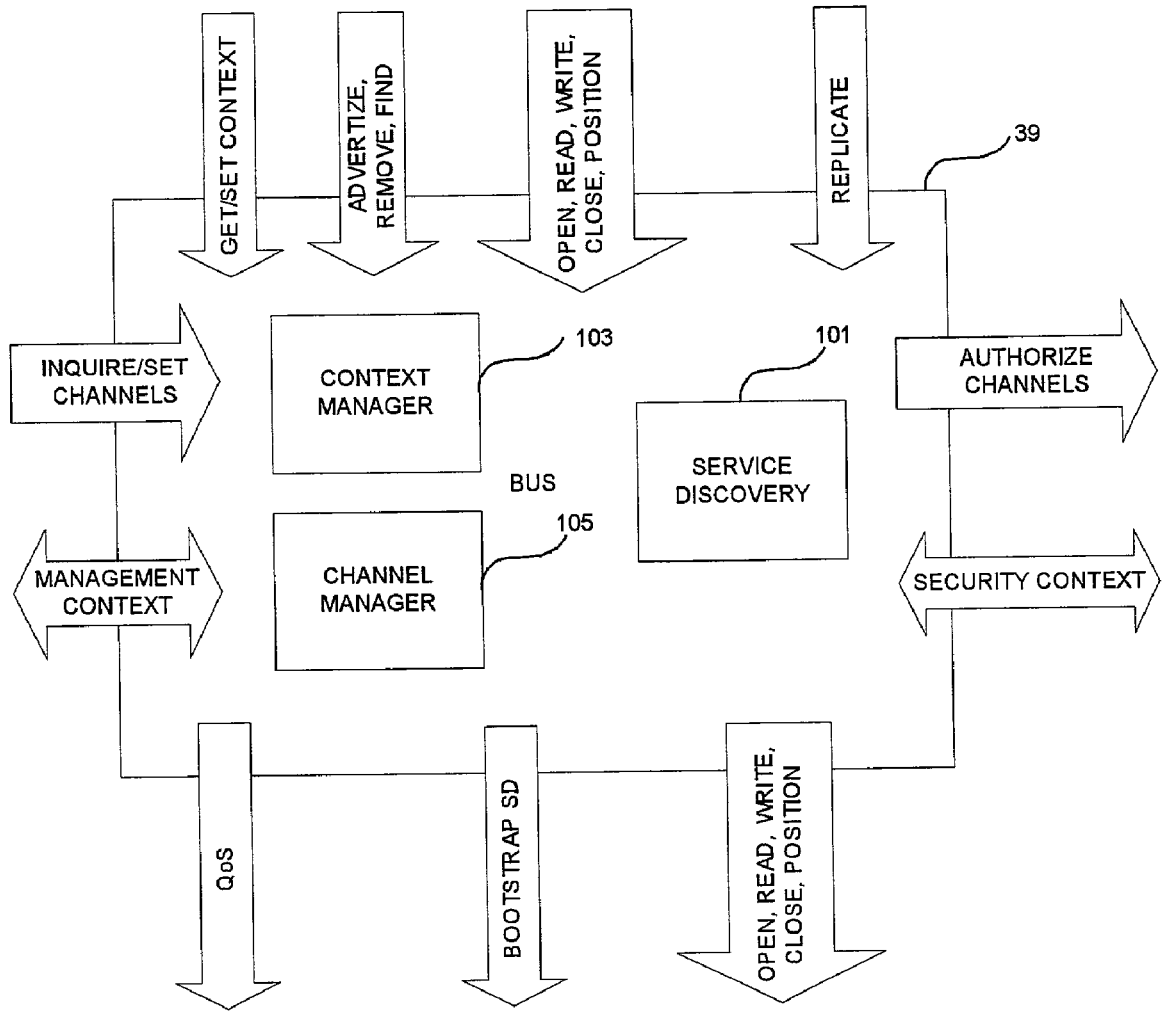
FIG. 5 is a block diagram of the inter-prise bus component of the present invention.

Referring now to FIG. 5, there is shown a block diagram of the internal subcomponents of, and the external interfaces to, inter-prise bus 39. Bus 39 includes those components that enable cooperating platforms to converse once a network is established. These components include the parts that connect the platforms and the messages on them. The inter-prise bus of the present invention is an abstraction of messaging and it allows applications, and other system level components, to operate without knowledge of messaging transport syntax and semantics. As will be explained in detail hereinafter, bus 39 includes a service discovery component 101, a context manager component 103, and a channel manager component 105.

According to the present invention, applications are not aware of, or concerned with, which messaging infrastructure is used. Similarly, bus 39 understands services and interaction styles, but the knowledge of applications is left to the processing model component. However, bus 39 has a set of messaging styles that closely match those of the processing model in order to support the styles efficiently. The first interaction style is request/reply messaging, in which services are advertised by a container on behalf of an application. Bus 39 provides both the means of advertising and the means to make contact with the application container. The bus does not handle starting the application to perform the service, or other process management issues, which are the job of the container part of the processing model.

Events are the second interaction style. In this style, an application container publishes that an event has occurred. Other parties register their interest in events by subscription. The bus, through its service discovery component 101, provides services to advertise publisher's intentions, to discover those intentions, and a mechanism to connect with a publisher. The bus is responsible for connecting the publishers and subscribers, regardless of where they are. It may do so by using proxies, brokers, or any other technique that it chooses. Applications are as ignorant of the details as possible.

The final interaction style is streams. This style is a bulk or batch style in which one application acts as a source of data and one acts as a sink. The source application sends the sink application a stream of data. The role of the bus is to provide a mechanism that allows the source and sink to communicate. If the two applications do not exist at the same time, the bus provides a tank that keeps the data sent by the source until the sink is ready, or until the data has expired.

The fundamental building block of the inter-prise bus is a channel, which is a named logical construct that allows code to have transport and location transparency. The bus of the present invention provides interfaces to open, close, read to, and write from all channels for low level callers.

Channels according to the present invention exist in three subtypes. A request, and possibly a response, flows over a service channel. The service channel is established after a service discovery call has located a suitable service. Events are published over an event channel. An event channel is established explicitly or implicitly by the publisher code prior to generating an event. Subchannels are the construct by which subscribers designate the messages that they want to see by logical name. There may be many subchannels per channel. Finally, a stream is a channel into which a set of data is placed, by a source that is to be consumed by a sink. The stream provides efficiency and serialization, because it allows a single sink to operate on a set of data.

According to the present invention, there are two types of streams. A mapped stream is mapped onto a tank. A tank is an externally named object that is known to both the source and the sink. An unmapped stream is not mapped to a tank. Rather, an unmapped stream is known only by its dynamically generated handle, which is passed from source to sink as part of an event or a request.

Figure 7:
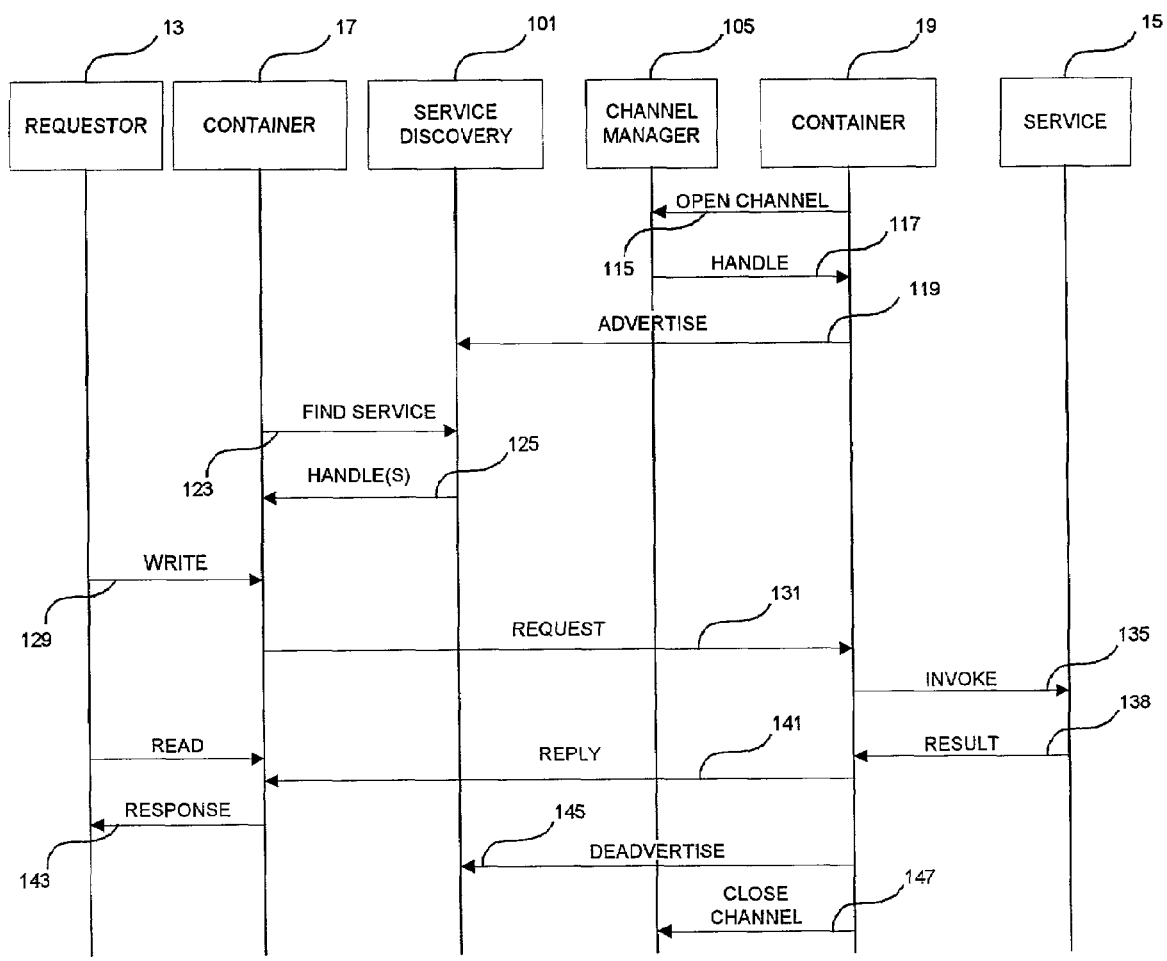
FIG. 7 is a flow diagram of service request interactions according to the present invention.

The operation of services provided by the inter- prise bus according to the present invention is illustrated with respect to FIGS. 7-10. Referring first to FIG. 7, a service channel is a connection between a service provider 15 and requesters, such as requester 13. According to the present invention, service provider 15 resides in a container 19. A service channel is built when requested by the service advertising its availability. More specifically, container 19 sends an open channel message 115 to channel manager 105 of bus 39. Channel manager component 105 returns a handle 117, which is the logical name of the service channel, to container 19 and container 19 advertises the service provided by service 15, as indicated at 119, with service discovery component 101 of bus 39. The advertisement contains the handle.

When requester 13 needs a service, its container 17 sends a find service message 123 to service discovery component 101. In response, service discovery component 101 returns the handle, as indicated at 125, to requester 113. Then, requester 13 writes, as indicated at 129, a request 131 to container 19. After writing the request, requester sends a read message 139 to bus 39. Container 19 reads the request and invokes service 15, as indicated at 135. Service 15 returns a result to container 19, as indicated at 137. Container 19 then sends a reply message 141 to container 17. Requestor 13 reads the reply as a response 143. When service 15 goes out of service, container 19 sends a deadvertise message 145 to service discovery component 101 and a close channel message 147 to channel manager component 105 of bus 39.

Figure 8:
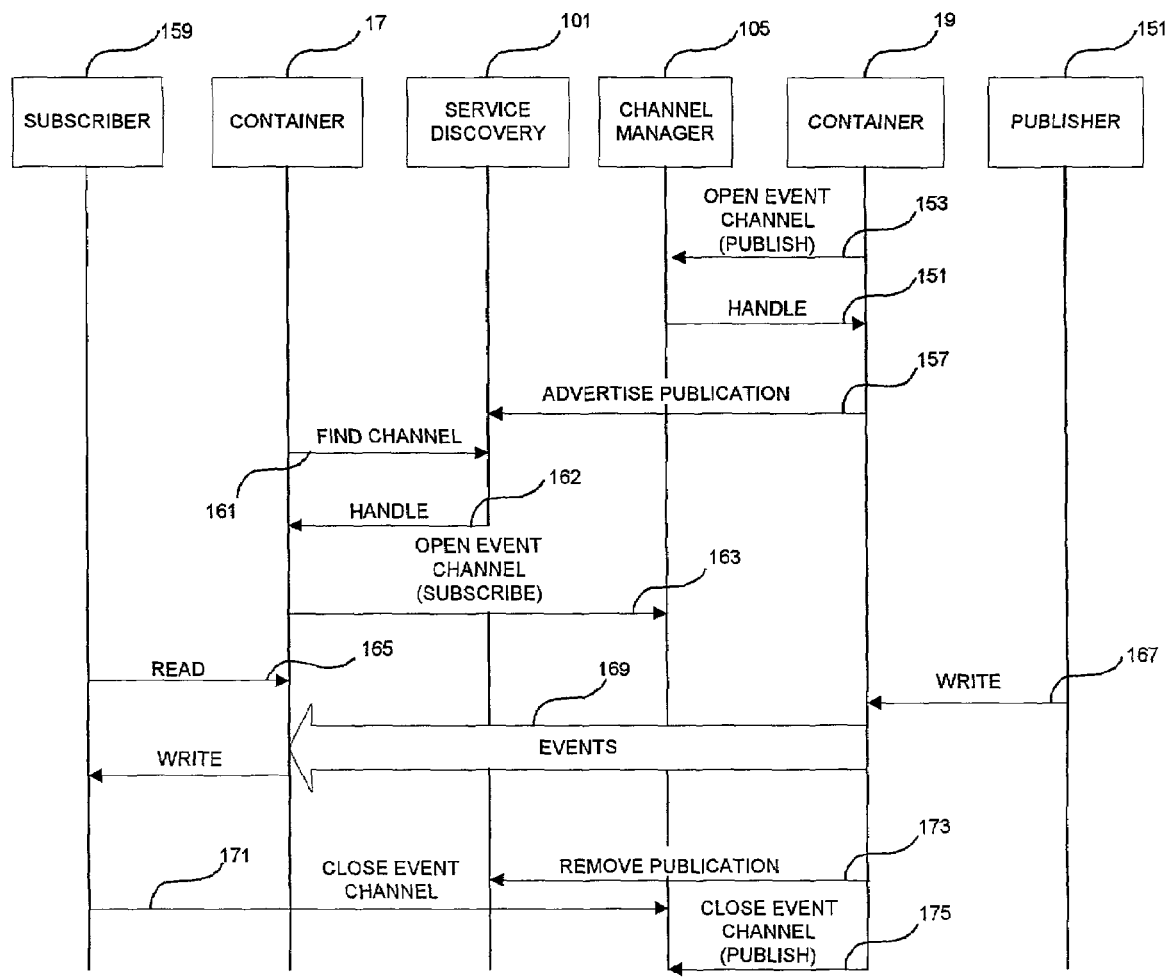
FIG. 8 is a flow diagram of event channel interactions according to the present invention.

Referring now to FIG. 8, there is shown event channel interactions according to the present invention. An event channel is a virtual connection between publishers and subscribers. An event channel is built when a publication high-level subject is defined and it is destroyed when that subject is deleted. The container 19 of a publisher 151 requests to open an event channel with channel manager 151, as indicated at 153. The channel manager component 105 of bus 39 returns a handle identifying the event channel to container 19, as indicated at 155. Then, container 19 advertises publication, including the handle that identifies the event channel, with service discovery component 101, as indicated at 157. The advertisement includes the handle that identifies the event channel. container 17 associated with a subscriber 159 sends a find channel message to service discovery component 101, as indicated at 161. Service discovery component 101 returns the handle, as indicated at 162. Then, requester 159 subscribes by opening the event channel with the handle, as indicated at 163. Then, requestor 159 indicates its availability to read from the channel, as indicated at 165. Publisher 151 writes, at 167, events 169 to bus 39 and requester 159 reads the events from bus 39. When requester has read the events, it can close the event channel, as indicated at 171. When publisher 151 desires to quit publication, it sends a remove publication message 173 to service discovery component 101, and sends a close event channel message 175 to channel manager component 105 of bus 39.

Figure 9:
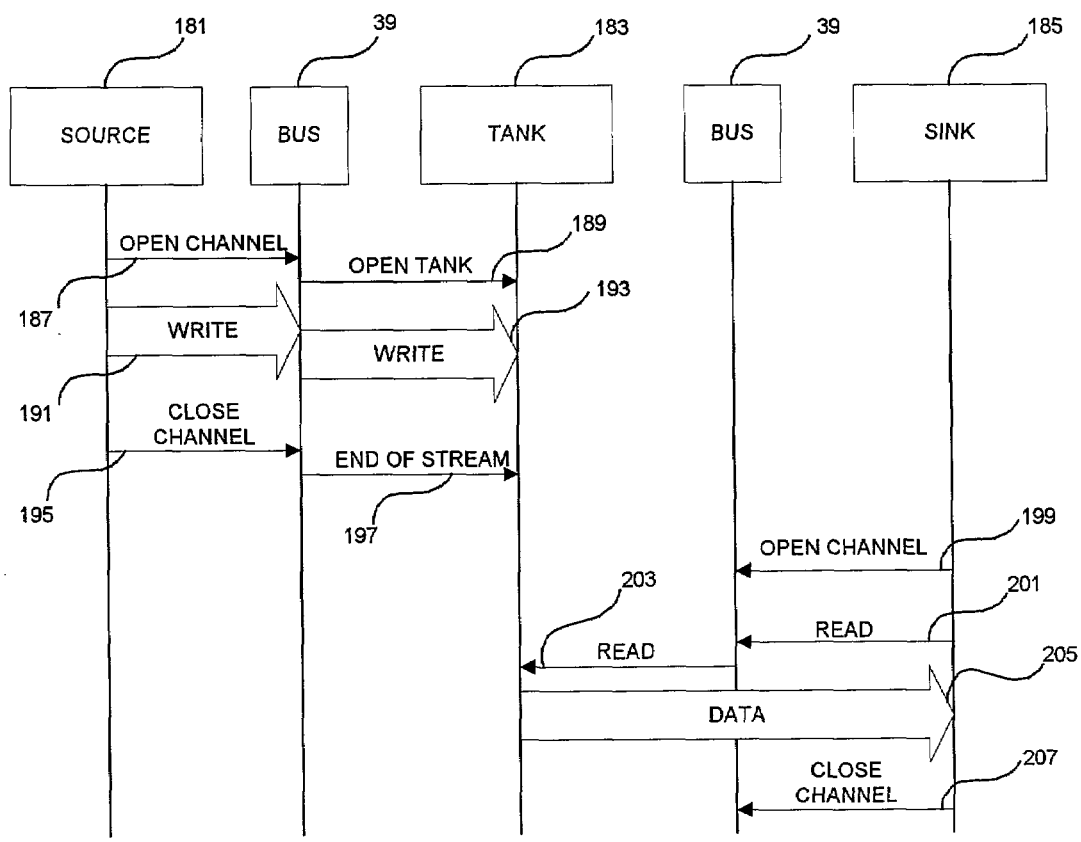
FIG. 9 is a flow diagram of mapped stream interactions according to the present invention.

Referring now to FIG. 9, there is illustrated a mapped stream according to the present invention. In a mapped stream, a source 181 writes data to a tank 183 provided by channel manager component 105 of bus 39. The mapped stream channel is identified by the logical name of the tank, which is known to both the source and the sink. A sink 185 reads the data from tank 183. More specifically, source 181 sends an open channel message 187 to bus 39. Channel manager component 105 of bus 39 opens tank 183, as indicated at 189. Then, source 181 writes the data, as indicated at 191, to bus 39. Bus 39 in turn writes the data to tank 183, as indicated at 193. At the conclusion of writing the data, source 181 sends a close channel message 195 to bus 139, and bus 139 sends an end of stream message 197 to tank 183.

When sink 185 desires to read data from the stream, it sends an open channel message 199 and a read message 201 to channel manager component 105 of bus 39. Bus 39 in turn sends a read message 203 to tank 183, whereupon sink 185 reads the data from tank 183, as indicated at 205. When sink 185 is through reading the data, it sends a close channel message 207 to bus 39.

Figure 10:
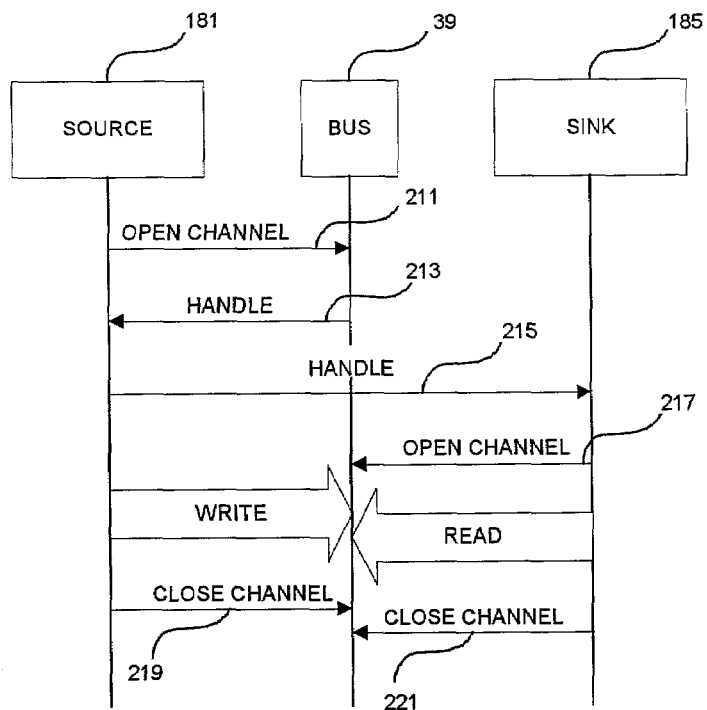
FIG. 10 is a flow diagram of unmapped stream interactions according to the present invention.

Referring now to FIG. 10, there is illustrated unmapped stream interactions according to the present invention. A source 181 opens a channel to bus 39, as indicated at 211. Bus 39 returns a handle to source 181, as indicated at 213. Source 181 transmits the handle to sink 185, as indicated at 215. Sink 185 uses the handle to open the channel, as indicated at 217. Then, source 181 and sink 185 write and read to and from, respectively, the stream identified by the handle. At the conclusion of the session, source 181 and sink 185 close the channel, as indicated at 219 and 221, respectively.

Every unit of data that flows on the bus is called a message. The bus is designed to be neutral on the subject of the internal data format, or payload, that two or more cooperating processes use. The data format can be any format the two parties agree on.

According to the present invention, every message on the bus can consist of context and data. Context is information that is relevant to the processing of the request, but it does not refer to the substance of the event, request, or stream. There are user-defined contexts, and system-defined contexts such as security, audit, and monitoring.

The bus provides mechanisms to set and get contexts, and it includes a way of invoking individual context managers 102 (FIG. 5) when the application makes requests of the bus, or when messages are received. When messages are sent, the context is packaged with the data by the bus. When messages are received, the bus strips the context off, ready for retrieval by the context managers. For example, when an application opens a channel, the security manager is called to verify that this application is authorized for use of the channel. As part of that process, the security manager also sets the channel security context from the application security context. If that context remains unchanged, it is sent with the message on a subsequent write request. On the receiving system, the security context is populated from the message. The security manager is invoked to check if this request can invoke the service. The security manager calls the bus to obtain the context and perform the check. Monitoring and audit contexts work in similar ways.

Figure 6:
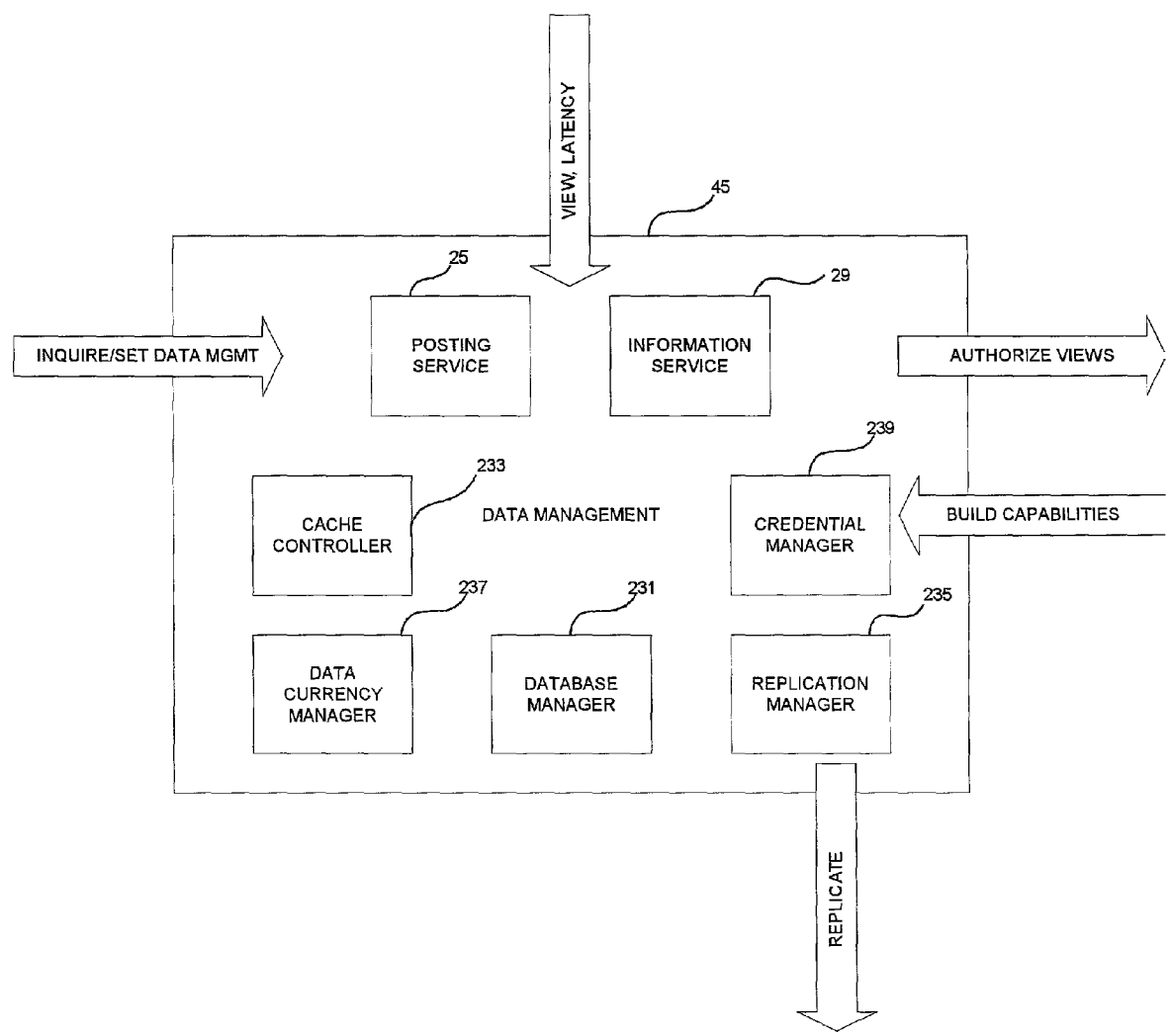
FIG. 6 is a block diagram of the data management model component of the present invention.

FIG. 6 illustrates the external interfaces to, and the internal subcomponents of, data management component 45. A database manager 231 is responsible for unit of work data preservation and physical and logical storage of the data and metadata. Information service 29 is a subcomponent that gives a response back to callers about the data it fronts and the logic it contains. Information service 29 may use data, logic, and cache to determine the response. In addition to the data, information service 29 can return information about latency. Information service 29 is responsible for calling the security manager 33 (FIG. 1) for any high-level security abstractions, such as business rules about who has access to data based upon account information. However, information service 29 is not responsible for standard data checking, for which data manager 231 calls on the security manager, as a matter of course.

Posting service 25 applies updates to databases and triggers cache controller 233 calls that are needed locally. Publication events over the inter-prise bus that inform interested parties that data has changed are performed by posting service 25. Cache controller 233 is called with an update and refreshes the cache that it manages for information service 29.

A replication manager 235 is an encapsulation, at the system level, of a hook into database manager 231. Replication manager 235 is triggered by updates and a set of posting services. Replication manager 235 uses the inter-prise bus to replicate data from the update originator to target systems and to cause the encapsulated posting services to run there. Replication manager 235 includes logic to preserve unit of work updates, as well as logic to ensure that only the latest version of a row is applied to a target site. A data currency manager 237 has interfaces that information service 29 can use to determine which version of the database to use, i.e., real-time or point-in-time, and what the latency of the data is. Data currency manager 237 gets its information from database manager 231 and replication manager 235. A credential manager 239 grants credentials. Credential manager 239 is called by security to generate or retrieve credentials when a user authenticates to the system.

Some credentials are stored in a directory structure and some are generated after access to business services.

Figure 13:
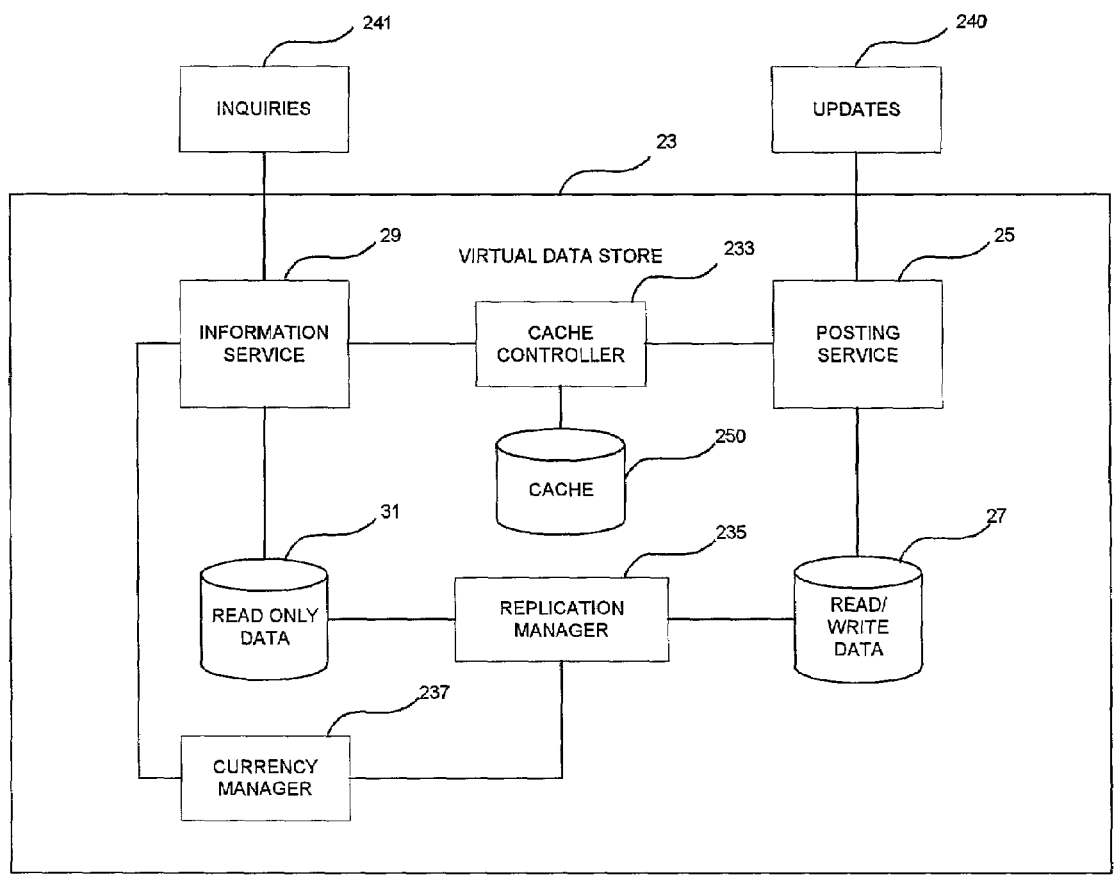
FIG. 13 is a block diagram illustrating a virtual data store according to the present invention.

FIG. 13 illustrates the functional relationship between components of virtual data store 23 according to the present invention. Updates 240 are received at posting service 25 and posted to read/write database 27. Posting service 25 also triggers cache controller 233 calls that are need locally. Data from read/write database 27 is selectively replicated to distributed read only databases 31 by replication manager 235. Information service 29 responds to inquiries 241 with data from read only data 31 or cache 250, as appropriate. Information service 29 uses currency manager 237 to determine (1) which version of data to use and (2) what the latency of the data is.

What is claimed is:

1. A computing system, which comprises:
  a bus which includes a channel manager component which provides for at least three different types of channels which provide for communication between a plurality of different service requestors and a plurality of different service providers, and which includes a service discovery component which identifies a plurality of different types of interfaces for the plurality of different service providers;
  a service requestor container operatively coupled to said bus, said service requestor container containing a service requestor application;
  a service provider container operatively coupled to said bus, said service provider container containing a service provider application;
  wherein the service provider container includes an interaction broker component, said interaction broker providing an interface between said bus and said service provider application;
  wherein said interaction broker component includes a request broker component, which provides an operation interface, for invoking said service provider application based upon service requests received from said bus;
  wherein said interaction broker component includes an event handler component, which provides an event interface, for invoking said service provider application based upon events read from said bus;
  wherein said interaction broker component includes a stream handler component, which provides a stream interface, for invoking said service provider application based upon data read from a stream;
  wherein the different types of channels correspond to the plurality of different interfaces; and,
  a virtual data store operatively coupled to said service requestor container and to said service provider container.

2. The computing system as claimed in claim 1, wherein the at least 3 subtypes of channels includes a service channel, an event channel and a stream channel.

3. The computing system as claimed in claim 2, wherein said service provider container includes a component for advertising the service provided by said service provider application to said service discovery component.

4. The computing system as claimed in claim 3, wherein said service requestor container includes a component for finding a service advertised to said service discovery component.

5. The computing system as claimed in claim 1, including a plurality of service provider containers operatively coupled to said bus, each of said service provider containers containing a service provider application.

6. The computing system as claimed in claim 5, wherein a first of said service provider containers is a publisher container and a second of said service provider containers is a subscriber container.

7. The computing system as claimed in claim 6, wherein:
  said publisher container includes a component for advertising publication of an event.

8. The computing system as claimed in claim 6, wherein:
  said subscriber container includes a component for subscribing to publication of an event.

9. The computing system as claimed in claim 1, wherein said virtual data store includes:
  a posting service component operatively coupled to said service provider container.

10. The computing system as claimed in claim 9, wherein said virtual data store further includes:
  a read/write data store operatively coupled to said posting service.

11. The computing system as claimed in claim 9, wherein said virtual data store further includes:
  an inquiry service component operatively coupled to said service requestor container;
  a read-only data store operatively coupled to said inquiry service component; and,
  a replication component operatively coupled to said read-only data store and said read/write data store.

12. The computing system as claimed in claim 9, wherein said channel manager component being adapted to a create channel in response to receipt of an open channel message from a first container wherein each of said channels is identified by a logical channel name.

13. The computing system as claimed in claim 12, wherein said logical channel name is a handle dynamically created by said channel manager component.

14. The computing system as claimed in claim 12, wherein said channel manager component is adapted to create a tank, and said logical name is a name of said tank.

15. The computing system as claimed in claim 12, wherein said channel is a service channel.

16. The computing system as claimed in claim 12, wherein said channel is an event channel.

17. The computing system as claimed in claim 12, wherein said channel is an unmapped stream.

18. The computing system as claimed in claim 12, wherein said channel is a mapped stream.

19. The computing system as claimed in claim 18, wherein said channel manager component is adapted to create a tank associated with said mapped stream.

20. The computing system as claimed in claim 12, wherein said channel manager component is adapted to transmit said logical name to said first container.

21. The computing system as claimed in claim 20, wherein said service discovery component being adapted to receive said logical name from said first container.

22. The computing system as claimed in claim 21, wherein said service discovery component is adapted to transmit said logical name to a second container in response to a find channel message from said second container.

23. The computing system as claimed in claim 12, including a context manager component, said context manager component being adapted to determine if a container is authorized to use a channel.

24. The computer system as claimed in claim 1, wherein each said container comprises:

an interface to said bus; and,
an interaction broker, said interaction broker being adapted to invoke a service based upon an interaction style on said bus.

25. The computer system as claimed in claim 24, wherein said container includes means for enabling said service to participate in extended units of work.

26. The computer system as claimed in claim 25, wherein said means for enabling said service to participate in extended units of work includes means for providing compensating actions for every action that can be performed by said service.

27. The computing system as claimed in claim 24, wherein said container includes means for encapsulating security policies on behalf of said service.

28. The computer system as claimed in claim 24, wherein said container includes means for encapsulating system management policies on behalf of said service.

29. The computing system as claimed in claim 1, wherein said virtual data store comprises:
a posting service coupled to receive data updates from said service provider container;
a first database coupled to said posting service;
an information service coupled to provide data in response to inquiries from said service requester container;
at least one second database coupled to said posting service; and,
a replication manager coupled between said first database and said at least one second database for selectively replicating data from said first database to said second database.

30. The computing system as claimed in claim 29, wherein said first database is a read/write database.

31. The computing system as claimed in claim 29, wherein said at least one second database is a read only database.

32. The computing system as claimed in claim 29, including a data cache coupled to said information service.

33. The computing system as claimed in claim 32, wherein said information service includes means for selectively satisfying inquiries from said service requestor container from one of said data cache and said at least one second database.

34. The computing system as claimed in claim 32, including a cache controller coupled between said data cache and said information service.

35. The computing system as claimed in claim 34, wherein said cache controller is coupled to said posting service.

36. The computing system as claimed in claim 29, wherein said information service includes means for calling a security manager for security information.

37. The computing system as claimed in claim 29, wherein said replication manager includes logic to preserve unit of work updates.

38. The computing system as claimed in claim 29, wherein said replication manager includes logic to ensure that only the latest version of data is replicated to said at least one second database.

39. The computing system as claimed in claim 29, including a data currency manager coupled to said information service to enable said information service to determine what version of data to use to satisfy a inquiry from said service requestor container.

40. The computing system as claimed in claim 29, including a data currency manager coupled to said information service to enable said information service to determine latency of data in said at least one second database.

* * * * *